United States Patent [19]
Lewis

[11] 3,939,475
[45] Feb. 17, 1976

[54] METHOD OF MEASURING RANGE WITH LARGE BISTATIC ANGLE RADAR

[75] Inventor: Bernard L. Lewis, Oxon Hill, Md.

[73] Assignee: The United States of America as represented by the Secretary of the Navy, Washington, D.C.

[22] Filed: Oct. 11, 1974

[21] Appl. No.: 514,047

[52] U.S. Cl. ............................ 343/12 R; 343/112 D
[51] Int. Cl.² ........................................... G01S 9/37
[58] Field of Search ...................... 343/12 R, 112 D

[56] References Cited
UNITED STATES PATENTS

| | | |
|---|---|---|
| 3,150,372 | 9/1964 | Groth, Jr. ....................... 343/112 D |
| 3,307,192 | 2/1967 | Attwood ......................... 343/112 D |
| 3,333,264 | 7/1967 | Knepper............................ 343/12 R |
| 3,487,462 | 12/1969 | Holberg ............................ 343/12 R |

*Primary Examiner*—Malcolm F. Hubler
*Attorney, Agent, or Firm*—R. S. Sciascia; Arthur L. Branning; Norman Brown

[57] ABSTRACT

Measurement of the range of a detected target is accomplished through utilization of a large bistatic-angle radar system having two transmitters used in conjunction with a receiver indicating the duration of received target forward-scattered signals from each transmitter.

3 Claims, 4 Drawing Figures

METHOD OF MEASURING RANGE WITH LARGE BISTATIC ANGLE RADAR

BACKGROUND OF THE INVENTION

The present invention relates to radar systems and more particularly to large bistatic-angle range-determining radar systems.

Bistatic-angle radar systems utilize a radar receiver spaced at a large angle from the transmitter when viewed from the target.

Forward-scattering of radar energy by the target is the fundamental basis of large bistatic-angle radar systems, in contrast to the more common backscatter-based radar systems. The forward-scattering gain for a given target is generally much larger than the backscatter gain. Because of the greater gain, forward-scattering systems are capable of detecting targets at greater distances and with less power than conventional backscatter systems. Generally, prior types of forward-scattering systems cannot determine the range or location of a detected target. Obviously this is a very critical deficiency, and one that has limited the utility of forward-scatter systems.

The present invention provides a range-determining capability to forward-scattering radar systems, thus allowing utilization of these systems in a more meaningful and useful manner than heretofore possible.

SUMMARY OF THE INVENTION

The present invention is a large bistatic-angle radar system utilizing two transmitters and a receiver distantly spaced along a line or arc of a great circle.

Energy simultaneously transmitted from each transmitter is forward-scattered by a target into two corresponding beams. These beams are received at the receiver during overlapping periods of time. The distance of the target from the receiver is then determined from the known distances between receiver and transmitters in combination with the measured time duration over which each signal is received.

It is therefore an object of the present invention to determine the range of a detected target by use of a large bistatic-angle radar system.

Other objects, advantages and novel features of the invention will become apparent from the following detailed description of the invention when considered in conjunction with the accompanying drawings wherein:

DETAILED DESCRIPTION OF THE INVENTION

Figure 1:
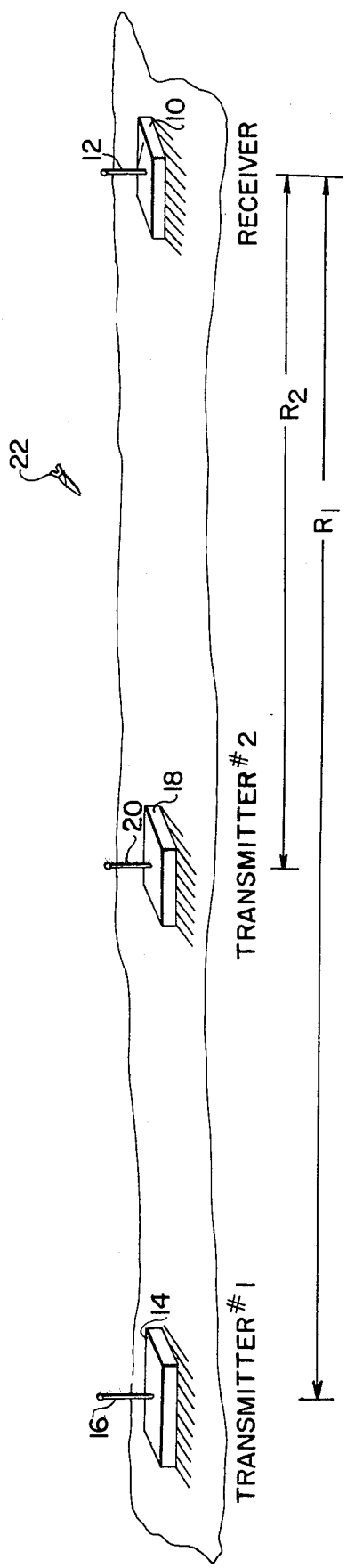
FIG. 1 depicts in pictorial fashion an embodiment of the present invention.

Referring now to FIG. 1, a radar receiver station 10 has an associated radar antenna 12. Located at a distance from receiver station 10 are two radar transmitter stations 14, 18. The first radar transmitter station 14 (farthest from receiver station 10) has a transmitting antenna 16, while the second transmitter station 18 (nearest the receiver station 10), has a transmitting antenna 20. First transmitting antenna 16 is spaced at a distance $R_1$, typically 70–150 miles, from receiver antenna 12, while second transmitting antenna 20 is spaced at a distance $R_2$, typically 50–100 miles, from antenna 12. These typical distances are adequate for obtaining a useful target range accuracy. For greater accuracy, the stations 10, 14, and 18 must be spaced farther apart.

A flying target 22 is shown located between radar receiver station 10 and the second transmitter antenna 20.

Figure 2:
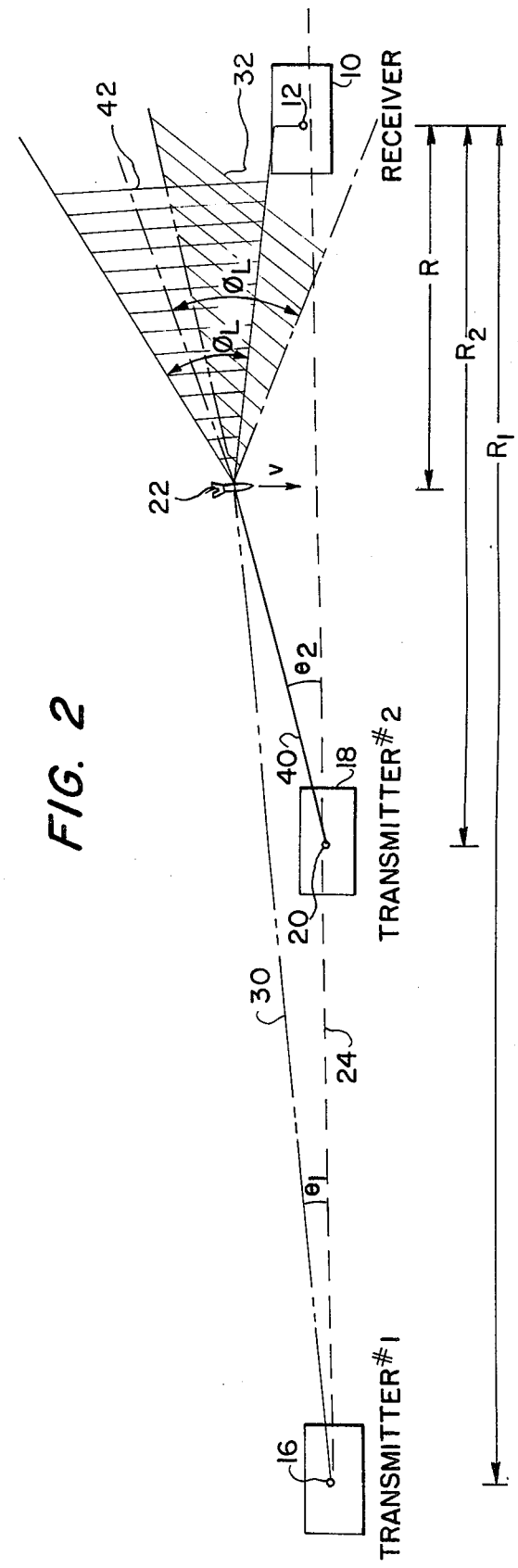
FIG. 2 is a top view of the embodiment of the present invention depicted in FIG. 1.

FIG. 2 shows a top view of the arrangement of elements of the embodiment of the present invention depicted in FIG. 1. All antennas 12, 16, and 20 are spaced along a base line 24. Base line 24 may, for example, be an arc of a great circle on the surface of the earth. Target 22 is spaced at a distance R from receiver antenna 12, and is moving with a velocity component v in a direction perpendicular to base line 24.

In operation, first and second transmitting stations 14, 18 each simultaneously transmit a radar signal respectively denoted as 30 and 40. These signals have essentially the same frequency (having a wavelength $\lambda$), but are coded in a manner as to allow the receiving station 10 to readily distinguish between the two signals and to separately process them. Coding may be accomplished, for example, by having one signal different from the other by a few Hz.

An azimuthal angle $\theta_1$ is formed between the first signal beam 30 (from first transmitter antenna 16 to the target 22) and base line 24. Similarly, an azimuthal angle $\theta_2$ is formed between the second signal beam 40 (from second transmitter antenna 20 to the target 22) and the base line 24.

Figure 3:
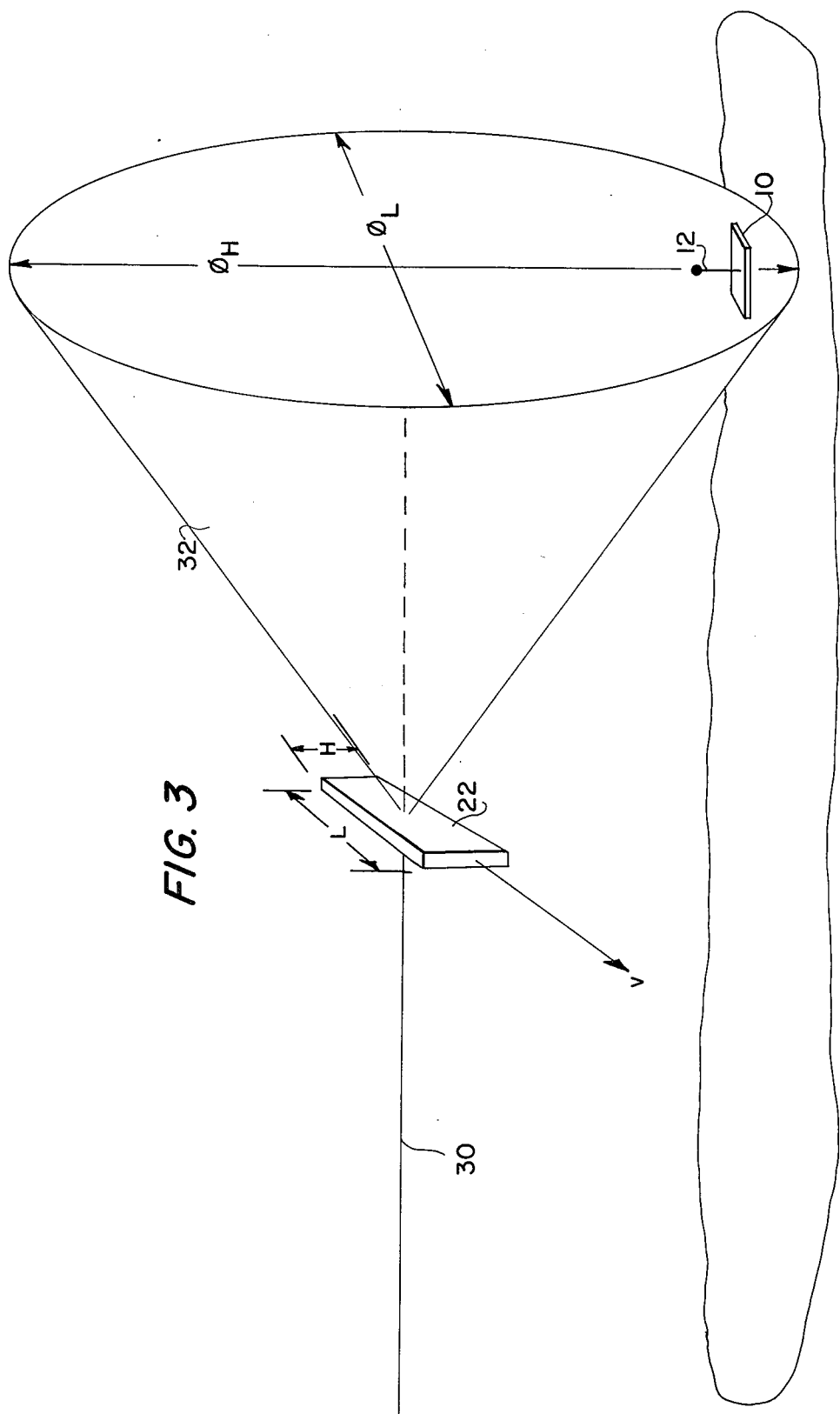
FIG. 3 depicts in pictorial fashion a beam-pattern resulting from a target forward-scattering an incident radar beam.

When the first signal-beam 30 impinges on the target 22, a first forward-scattered signal 32 results. The beam-pattern of this forward-scattered signal 32 is depicted in FIG. 3 (FIG. 2 shows the beam horizontal cross-section). Forward-scattering beam-pattern characteristics are a well-known function of the target cross-sectional area intercepting the impinging energy beam and the wavelength $\lambda$ of that energy. Explanation of the forward-scattering of energy is described in various textbooks dealing with diffraction of electromagnetic energy such as "Methods of Radar Cross-section Analysis" by J. Crispin and M. Siegel, Academic Press, 1968, at page 176, and will not be further explained.

The target 22 presents a cross-section having a dimension L in the horizontal direction and a dimension H in the vertical direction. The forward-scattered beam 32 has an angular elevation beamwidth $$\phi_H = \text{arc sin } \frac{\lambda}{H},$$

and an angular horizontal beamwidth of $$\phi_L = \text{arc sin } \frac{\lambda}{H},$$

The forward-scattered beam 32 will move with the target 22, causing the beam 32 to sweep past the receiver antenna 12.

In order to detect targets 22 at an elevation up to 45° above the horizontal from receiving station 10, the frequency of operation is chosen so that the angular elevation beamwidth $\phi_H \simeq 90°$. This requires that $$\frac{\lambda}{H} \simeq 1,$$

yielding $\lambda \simeq H$.

For a typical target having a length $L = 10H$, the angular horizontal beamwidth $$\phi_L \simeq \arcsin \frac{\lambda}{L}$$
$$= \arcsin \frac{\lambda}{10H}$$
$$= \arcsin \frac{\lambda}{10}$$
$$= \arcsin (0.1)$$

$\phi_L \simeq 6°$.

It is well known that the angular distance between 3 dB points in a beam-pattern is approximately the same as the angular distance between the peak and first null. Thus, the distance between 3 dB points in the horizontal plane of the beam-pattern is also approximately equal to $$\phi_L \left( = \arcsin \frac{\lambda}{L} \right).$$

Referring again to FIG. 2, the beam 32 has an angular velocity $\dot{\theta}_1$. When viewed from first transmitter station 14, the target 22 is at an angle $\theta_1$ with base line 24. The angular rate of change $\dot{\theta}_1$ of the target 22 is $$\dot{\theta}_1 = \arctan \frac{v}{R_1 - R}.$$

The time during which the beam 32 is received at a signal strength no less than 3 dB down from the peak received signal strength is denoted as dwell time $T_1$. One method of measuring $T_1$ is to record the received signal intensity as a function of time. After the forward-scattering signal has swept past the receiver antenna 12, the signal is examined to ascertain the point of peak signal strength and the 3 dB down points to either side. The duration corresponding to the time $T_1$ between the 3 dB points is then noted.

The period $T_1$ is also equal to $\theta_1 / \dot{\theta}_1$. Substituting for $\dot{\theta}_1$ and $\theta_1$ from above, $$T_1 = \frac{\theta_1}{\dot{\theta}_1} = \frac{\arcsin \frac{\lambda}{L}}{\arctan \left( \frac{v}{R_1 - R} \right)}$$

For $\lambda/L \leq 0.5$ (i.e., target length at least twice the wavelength $\lambda$), if $$\frac{v}{R_1 - R} \leq 0.5$$

and utilizing small angle approximations where $\arcsin \alpha \simeq \arctan \alpha \simeq \alpha$ for $\alpha \leq 0.5$, then, $$T_1 = \frac{\left(\frac{\lambda}{L}\right)}{\frac{v}{R_1 - R}} = \frac{\lambda}{L} \frac{(R_1 - R)}{v}$$

In a fashion similar to that described above, the signal beam 40 from the second transmitter station 16 is scattered by target 22 to form a second forward-scattered beam-pattern 42. By virtually identical calculations, it is seen that $T_2$, the time during which the second forward-scattered signal is received between 3 dB signal strength points at receiving station 12, is:

$$T_2 = \frac{\lambda}{L} \frac{(R_2 - R)}{v}.$$

Then, forming the ratio $T_1/T_2$ yields $$\frac{T_1}{T_2} = \frac{R_1 - R}{R_2 - R}.$$

Solving for R then yields:

$$R = \frac{T_2 R_1 - T_1 R_2}{T_2 - T_1}.$$

Since $R_1$ and $R_2$ are the known distances between transmitters and receivers, and since $T_1$ and $T_2$ are known measurements made as previously described, R is readily calculated.

Figure 4:
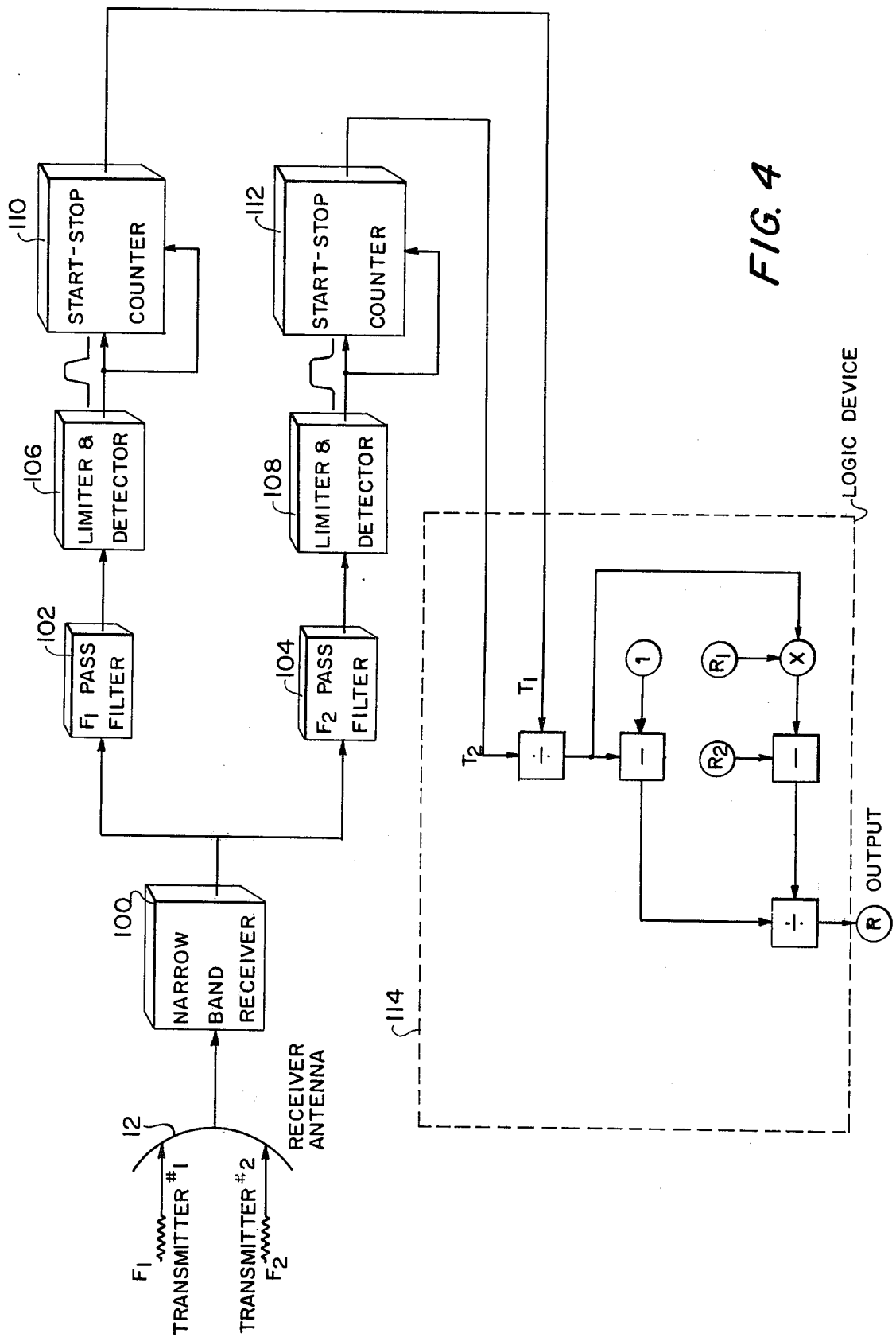
FIG. 4 depicts in functional block diagram typical arrangement for performing a portion of the invention.

Of many obvious ways of implementing the above description in order to determine time periods $T_1$ and $T_2$, and to calculate R, the design depicted in FIG. 4 is one. It should be noted that one skilled in the art could readily arrive at this or equivalent circuits and thus this particular design arrangement does not form a part of the present invention, other than to be one of many equivalent ways to implement a portion of the invention.

The receiver antenna 12 is connected to a narrow band receiver 100. A first bandpass filter 102 (for passing the receiver frequency F1 signal from transmitter No. 1), and a second bandpass filter 104 (for passing the frequency F2 signal from transmitter No. 2) both have their input terminals connected to the output of narrow-band receiver 100. A limiter and detector device 106 has its input connected to the output of filter 102, while a second limiter and detector device 108 has its input coupled to the output of filter 104. A start-stop counter 110 has both its input and control terminals connected to the output of detector 106. Similarly a start-stop counter 112 has its input and control terminals coupled to the output of detector 108. Signals indicative of the time $T_1$ and time $T_2$ are respectively provided at the output of counters 110 and 112. A logic device 114 receives the input signals $T_1$ and $T_2$ and combines them with the ranges $R_1$ and $R_2$ in accordance with the prior described method to produce the range value R.

It should be noted that elevation of the target 22 can also be determined by simply utilizing a set of stacked receiver beams in the conventional manner to determine the angle of incoming target signal.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A large bistatic-angle radar system for determining the distance, R, of a target from a receiving means comprising:

first and second transmitting means each adapted to transmit a radar signal of essentially the same frequency;

said receiving means receiving and separately processing target forward-scattered signals from said first and second transmitting means, and for measuring the time durations $T_1$ and $T_2$ during which each said respective forward-scattered signal is received at a signal strength greater than a predetermined level below its maximum received signal strength; and, each said first and second transmitting means being spaced at a large bistatic-angle from said receiving means, said first transmitting means being spaced at a distance $R_1$ from said receiving means, and said second transmitting means being spaced at a distance $R_2$ from said receiving means wherein $R_1$ is greater than $R_2$;

whereby the distance R is computed from the equation $$R = \frac{T_2 R_1 - T_1 R_2}{T_2 - T_1}.$$

2. The large bistatic-angle radar system of claim 1, wherein all said means are arranged in a generally collinear fashion, said second transmitting means arranged between said first transmitting means and said receiving means.

3. The large bistatic-angle radar system of claim 2, wherein said bistatic-angle is in the range between 160° and 200°.

* * * * *